US012688032B2

(12) United States Patent (10) Patent No.: US 12,688,032 B2
Griffin (45) Date of Patent: Jul. 21, 2026

(54) BUILDING A SPECIFICATION FILE USING CONTAINERIZED LAYERS DERIVED FROM FEATURE FLAGS

(71) Applicant: RED HAT, INC., Raleigh, NC (US)

(72) Inventor: Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 695 days.

(21) Appl. No.: 18/104,828

(22) Filed: Feb. 2, 2023

(65) Prior Publication Data

US 2024/0264826 A1 Aug. 8, 2024

(51) Int. Cl.
*G06F 8/71* (2018.01)
*G06F 8/10* (2018.01)
*G06F 8/65* (2018.01)

(52) U.S. Cl.
CPC ................. *G06F 8/71* (2013.01); *G06F 8/10* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 8,302,108 B1 | 10/2012 | Hurren et al. | |
| 10,104,185 B1 * | 10/2018 | Sharifi Mehr | G06F 9/45558 |
| 11,093,221 B1 * | 8/2021 | Novy | G06F 8/36 |
| 11,188,313 B1 | 11/2021 | Huffman et al. | |
| 11,422,850 B1 | 8/2022 | Kutik et al. | |
| 2016/0350081 A1 * | 12/2016 | Kumar | G06F 8/30 |

| | | | |
|---|---|---|---|
| 2021/0049002 A1 * | 2/2021 | Myers | G06F 9/44505 |
| 2021/0248058 A1 * | 8/2021 | Hattingh | G06F 11/3698 |
| 2021/0406073 A1 | 12/2021 | Pavlov et al. | |
| 2022/0129351 A1 * | 4/2022 | Carpenter | G06F 11/0757 |
| 2023/0393883 A1 * | 12/2023 | Tsonov | G06F 9/542 |

OTHER PUBLICATIONS

Ternava et al., "On the Interaction of Feature Toggles", https://hal.archives-ouvertes.fr/hal-03527250/file/VaMo22-paper8-HAL.pdf, Jan. 17, 2022, pp. 1-6.
Nevarez, Oscar, "Decoupling Monoliths with Container Orchestration and Feature Flags", https://launchdarkly.com/blog/decoupling-monoliths-with-container-orchestration-and-feature-flags/, Jul. 19, 2022; pp. 1-9.

(Continued)

*Primary Examiner* — Insun Kang
(74) *Attorney, Agent, or Firm* — Kilpatrick Townsend & Stockton LLP

(57) ABSTRACT

Containerized layers for a specification file used to deploy an application can be derived from feature flags. For example, a processing device can receive a request for a version of the application from a client device. The request can include a set of functionalities corresponding to a set of feature flags in a code base for the application. The processing device then can determine a set of containerized layers based on the set of feature flags. The set of containerized layers can be used to create the version of the application. To fulfill the request, the processing device may assemble the set of containerized layers in a particular arrangement to generate a specification file. The processing device can transmit the specification file to the client device to deploy the set of containerized layers as the version of the application in a container.

20 Claims, 4 Drawing Sheets

(56)        References Cited

OTHER PUBLICATIONS

"Enabling OpenShift Container Platform features using Feature Gates", https://docs.openshift.com/container-platform/4.6/nodes/clusters/nodes-cluster-enabling-features.html, Red Hat, Inc., 2022; pp. 1-5.

Siegmund et al., "Dimensions of Software Configuration", https://www.tu-chemnitz.de/informatik/ST/publications/papers/SRSFSE19.pdf, Nov. 8-13, 2020; pp. 338-349.

"Enabling UI Feature Flags on Kubernetes", https://www.ibm.com/docs/en/api-connect/10.0x?topic=configuration-enabling-ui-feature-flags-kubernetes, IBM, Nov. 3, 2022; 1-4.

* cited by examiner

200

300

400

| 402 |
| --- |
| Receive a request for a version of an application from a client device, the version comprising a set of functionalities corresponding to a set of feature flags in a code base for the application |

| 404 |
| --- |
| In response to receiving the request, determine a set of containerized layers based on the set of feature flags, the set of containerized layers being usable to create the version of the application |

| 406 |
| --- |
| Assemble the containerized layers to generate a specification file to fulfill the request |

| 408 |
| --- |
| Transmit the specification file to the client device to deploy the set of containerized layers as the version of the application in the container |

*FIG. 4*

BUILDING A SPECIFICATION FILE USING CONTAINERIZED LAYERS DERIVED FROM FEATURE FLAGS

TECHNICAL FIELD

The present disclosure relates generally to building containers. More specifically, but not by way of limitation, this disclosure relates to building a specification file using containerized layers derived from feature flags.

BACKGROUND

Software services such as applications, serverless functions, and microservices can be deployed inside containers within a computing environment. A container is a relatively isolated virtual environment created by leveraging the resource isolation features (e.g., cgroups and namespaces) of the Linux Kernel. Deploying software services inside containers can help isolate the software services from one another, which can improve speed and security and provide other benefits. The software services may include feature flags to enable or disable certain aspects of the software services without modifying source code or requiring a redeploy, for example to test new features of the software services. Feature flags may be referred to as feature gates, feature toggles, or feature switches.

Containers are deployed from image files using a container engine, such as Docker®. These image files are often referred to as container images. A container image can be conceptualized as a stacked arrangement of layers in which a base layer is positioned at the bottom and other layers are positioned above the base layer. The other layers may include a target software service and its dependencies, such as its libraries, binaries, and configuration files. The target software service may be configured to run (e.g., on a guest operating system) within the isolated context of the container.

BRIEF DESCRIPTION OF THE DRAWINGS

FIG. 4 is a flowchart of an example of a process for building a specification file using a set of containerized layers derived from a set of feature flags according to some aspects of the present disclosure.

DETAILED DESCRIPTION

Figure 1:
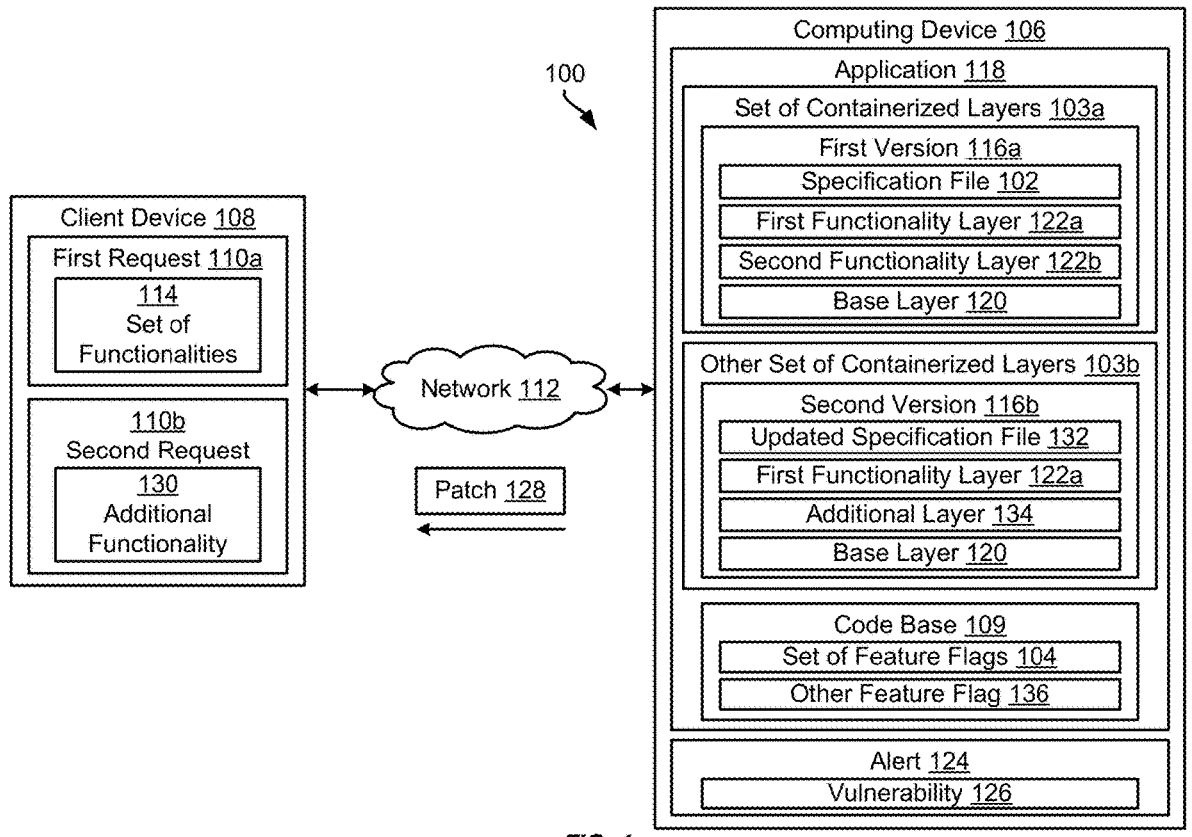
FIG. 1 is a block diagram of an example of a computing environment for building a specification file using a set of containerized layers derived from a set of feature flags according to some aspects of the present disclosure.

A code base may be designed to deploy a software application in a computing environment. The code base may include feature flags to enable a client device to customize the software application based on requirements specific to the client device. Specifically, the client device can use the feature flags to enable or disable code paths to execute different variants of the software application to include different functionalities based on enabled code paths. But, this can contribute to code bloat in the code base due to including code for each possible code path such that the code is physically present and running on a host server to await activation by the client device. This over-inclusivity means that the code base may store many extraneous files that are not needed by the software application. While this over-inclusivity provides advantages for building the different variants of the software application, it may unnecessarily expose a large number of attack vectors to malicious entities. This can particularly be the case when the software application only requires a small subset of files in the code base to function. Thus, this increased vulnerability can create an unnecessary security risk associated with the software application. Additionally, the extraneous files may unnecessarily consume computing resources (e.g., for maintenance or storage) as the extraneous files await activation.

Some examples of the present disclosure can overcome one or more of the abovementioned problems by converting a set of feature flags into a set of containerized layers used to deploy a version of an application with a set of functionalities. For example, a computing device can receive a request from a client device that includes the set of functionalities to be incorporated in the version of the application. A code base for the application can include a set of feature flags to enable logical separation of the set of functionalities. Instead of using the set of feature flags to provide the set of functionalities, the computing device can determine a set of containerized layers based on the set of feature flags. The computing device then can assemble the set of containerized layers in a particular arrangement to create a specification file used by the client device to deploy the version of the application. Using the set of containerized layers can maintain customizability afforded by the set of feature flags while minimizing extraneous files transmitted to the client device. And, minimizing extraneous files can decrease security risk associated with the version of the application. Additionally, when the computing device detects a vulnerability associated with the application, the computing device can generate a patch to address the vulnerability. The patch can be specific to the version of the application deployed by the client device. This can further reduce code bloat by minimizing extraneous files that are transmitted to and deployed by the client device. Relatively lower storage consumption associated with using the set of containerized layers additionally can enable lightweight computing devices (e.g., edge nodes in a distributed computing environment) to run the application.

In one particular example, a computing device may receive a request from a client device to include a logging functionality and a communication functionality in a version of an application. A code base for the application can include feature flags that correspond to the logging functionality and the communication functionality. Using the respective feature flag for each functionality, the computing device can determine a set of containerized layers to create the version of the application. The set of containerized layers can include a base layer and at least two functionality layers. For example, one functionality layer can correspond to the logging functionality, while another functionality layer can correspond to the communication functionality. Additionally, the computing device can determine the base layer based on compatibility of the base layer with an operating system of the client device.

The computing device then can assemble the set of containerized layers in a particular arrangement to generate a specification file to fulfill the request from the client device. The particular arrangement can ensure compatibility of each containerized layer in the set of containerized layers. For example, if the base layer is assembled as a bottom layer for the specification file, there may be two possible permutations for the particular arrangement of the functionality layers. Specifically, the two possible permutations may involve the logging layer being positioned as a top layer or a middle layer. For example, the computing device may attach the logging layer to the communication layer such that the communication layer is a middle layer and the logging layer is a top layer. In some examples, both possible permutations may successfully ensure compatibility of the set of containerized layers. Alternatively, only one permutation of the two possible permutations may ensure compatibility of the set of containerized layers. For example, code for the logging layer may depend on code in the communication layer. Therefore, the communication layer may precede the logging layer. Once the computing device assembles the set of containerized layers, the computing device can transmit the specification file to the client device, whereupon the client device can use the specification file to deploy the set of containerized layers as the version of the application in a container.

While the above example involved two functionalities being included in the request, this is intended to be illustrative and non-limiting. In other examples, the request may include a different number of functionalities. For instance, the request may include one functionality or three functionalities to implement in the application. Regardless, similar principles can be applied to allow the computing device to determine a set of containerized layers based on the one or more functionalities to create the specification file.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a computing environment 100 for building a specification file 102 using a set of containerized layers 103a derived from a set of feature flags 104 according to some aspects of the present disclosure. The computing environment 100 may include a computing device 106 communicatively coupled to a client device 108. For example, the computing device 106 can receive one or more requests 110 from the client device 108 via a network 112, such as the Internet. Examples of the client device 108 can include laptop computers, desktop computers, mobile phones, tablets, or wearable devices. The computing device 106 additionally can include a code base 109 that includes code for a set of functionalities 114 for an application 118 and a set of feature flags 104. The set of feature flags 104 in the code base 109 can be used to switch on or off different portions of the code base 109 to enable or disable different functionalities of the set of functionalities 114.

The client device 108 can transmit a first request 110a to the computing device 106 to implement the set of functionalities 114 in a first version 116a of the application 118. Instead of using the set of feature flags 104 that correspond to the set of functionalities 114, the computing device 106 can use the set of containerized layers 103a to fulfill the first request 110a. The set of containerized layers 103a can include one or more layers containing files (e.g., operating system files, libraries, configuration files, etc.) that are used to build the application 118. Specifically, the computing device 106 can stack the set of containerized layers 103a in a particular arrangement to create the specification file 102. Once the computing device 106 transmits the specification file 102 to the client device 108, the client device 108 can use a build tool to build the first version 116a of the application 118 using the specification file 102 created from the set of containerized layers 103a.

Creating the specification file 102 can involve identifying containerized layers that can implement the set of functionalities 114 in the first version 116a of the application 118. The computing environment 100 may include a database or a repository to store containerized layers that are generated based on the set of feature flags 104. In some examples, the computing device 106 can identify a base layer 120 to include in the set of containerized layers 103a based on an operating system of the client device 108. The base layer 120 can be positioned as a bottom layer in the set of containerized layers 103a such that the computing device 106 stacks each subsequent containerized layer upon the base layer 120. The computing device 106 can arrange the base layer 120 and one or more functionality layers 122a-b of the set of containerized layers 103a in a particular arrangement such the functionality layers 122a-b are stacked upon the base layer 120 in a compatible order. For example, once the computing device 106 identifies the base layer 120, the computing device 106 may identify a first functionality layer 122a and a second functionality layer 122b that are compatible with the base layer 120 to form the set of containerized layers 103a.

In some examples, the second functionality layer 122b may be a prerequisite layer for the first functionality layer 122a such that the first functionality layer 122a depends on the second functionality layer 122b to implement a single functionality. Each subsequent containerized layer that the computing device 106 adds to the set of containerized layers 103a can change availability of compatible containerized layers. For example, if six functionality layers are compatible with the base layer 120, attaching a specific functionality layer to the base layer 120 may preclude a subset of the six functionality layers from being compatible with the set of containerized layers 103a.

The specification file 102 additionally may include files corresponding to each containerized layer of the set of containerized layers 103a. For example, the specification file 102 can include base layer files containing operating system files for the base layer 120 of the set of containerized layers 103a. The client device 108 can use the operating system files to deploy an operating system for the first version 116a of the application 118. In some examples, the specification file 102 transmitted to the client device 108 can include metadata associated with building a specific version of the application 118. For example, the metadata can indicate the compatible order for the particular arrangement of the set of containerized layers 103a such that the build tool of the client device 108 can build the first version 116a of the application 118.

After receiving the specification file 102 from the computing device 106, the client device 108 then can use the specification file 102 to deploy the first version 116a of the application 118, for example using the build tool. In some examples, after creating the specification file 102, the computing device 106 may receive an alert 124 for a vulnerability 126 associated with the specification file 102. For example, once a vulnerability detector in the computing environment 100 detects the vulnerability 126 in the specification file 102, the vulnerability detector can transmit the alert 124 to the computing device 106. Examples of the vulnerability 126 can include bugs, exploits, unpatched program code, or a combination thereof. In response to receiving the alert 124, the computing device 106 may generate a patch 128 to address the vulnerability 126 for the set of containerized layers 103*a* and transmit the patch 128 to the client device 108. For example, the patch 128 can be specific to the first functionality layer 122*a* of the set of containerized layers 103*a*, thereby minimizing code bloat associated with patching the specification file 102. Once the client device 108 receives the patch 128, the client device 108 can deploy the patch 128 in the specification file 102 for the application 118.

In some examples, after the computing device 106 receives the first request 110*a*, the client device 108 may transmit a second request 110*b* with at least one additional functionality 130 for the computing device 106 to include in the application 118. In such examples, the computing device 106 can create an updated specification file 132 such that the client device 108 can use the updated specification file 132 to deploy a second version 116*b* of the application 118. The computing device 106 can identify at least one additional layer 134 using another feature flag 136 in the code base 109 that corresponds to the additional functionality 130.

To incorporate this additional layer 134 in the specification file 102, the computing device 106 may rebuild the set of containerized layers 103*a*. In some instances, if the additional layer 134 is compatible with the set of containerized layers 103*a*, the computing device 106 may simply transmit the additional layer 134 to the client device 108. The client device 108 then can attach the additional layer 134 to the set of containerized layers 103*a* to create the updated specification file 132. For example, the client device 108 may attach the additional layer 134 to the set of containerized layers 103*a* such that the additional layer 134 is positioned as a top layer and the base layer 120 is positioned as a bottom layer. The other containerized layers (e.g., the first functionality layer 122*a* or the second functionality layer 122*b*) in the set of containerized layers 103*a* can be positioned in the updated specification file 132 as intermediate layers between the top layer and the bottom layer.

Alternatively, if the additional layer 134 is incompatible with the set of containerized layers 103*a*, the computing device 106 may generate another set of containerized layers 103*b* by reassembling the set of containerized layers 103*a* to include the additional layer 134. For example, the other set of containerized layers 103*b* may include the additional layer 134 as an intermediate layer instead of attaching the additional layer 134 as a top layer for the set of containerized layers 103*a*. Additionally or alternatively, the computing device 106 may remove or replace one or more containerized layers of the set of containerized layers 103*a* to include the additional layer 134. Specifically, the computing device 106 can create the updated specification file 132 by removing an incompatible containerized layer that prevents the additional layer 134 from being used to implement the additional functionality 130. For example, if the second functionality layer 122*b* is incompatible with the additional layer 134, the computing device 106 can exclude the second functionality layer 122*b* when creating the updated specification file 132. Additionally, the computing device 106 may replace the incompatible containerized layer with a different containerized layer that is compatible with the additional layer 134 and other containerized layers in the updated specification file 132. In some examples, the computing device 106 may attach one or more prerequisite layers associated with the additional layer 134 to enable the additional layer 134 to implement the additional functionality 130.

While FIG. 1 depicts a specific arrangement of components, other examples can include more components, fewer components, different components, or a different arrangement of the components shown in FIG. 1. For instance, in other examples, another version of the application 118 may include more than two functionality layers. Additionally, any component or combination of components depicted in FIG. 1 can be used to implement the process(es) described herein.

Figure 2:
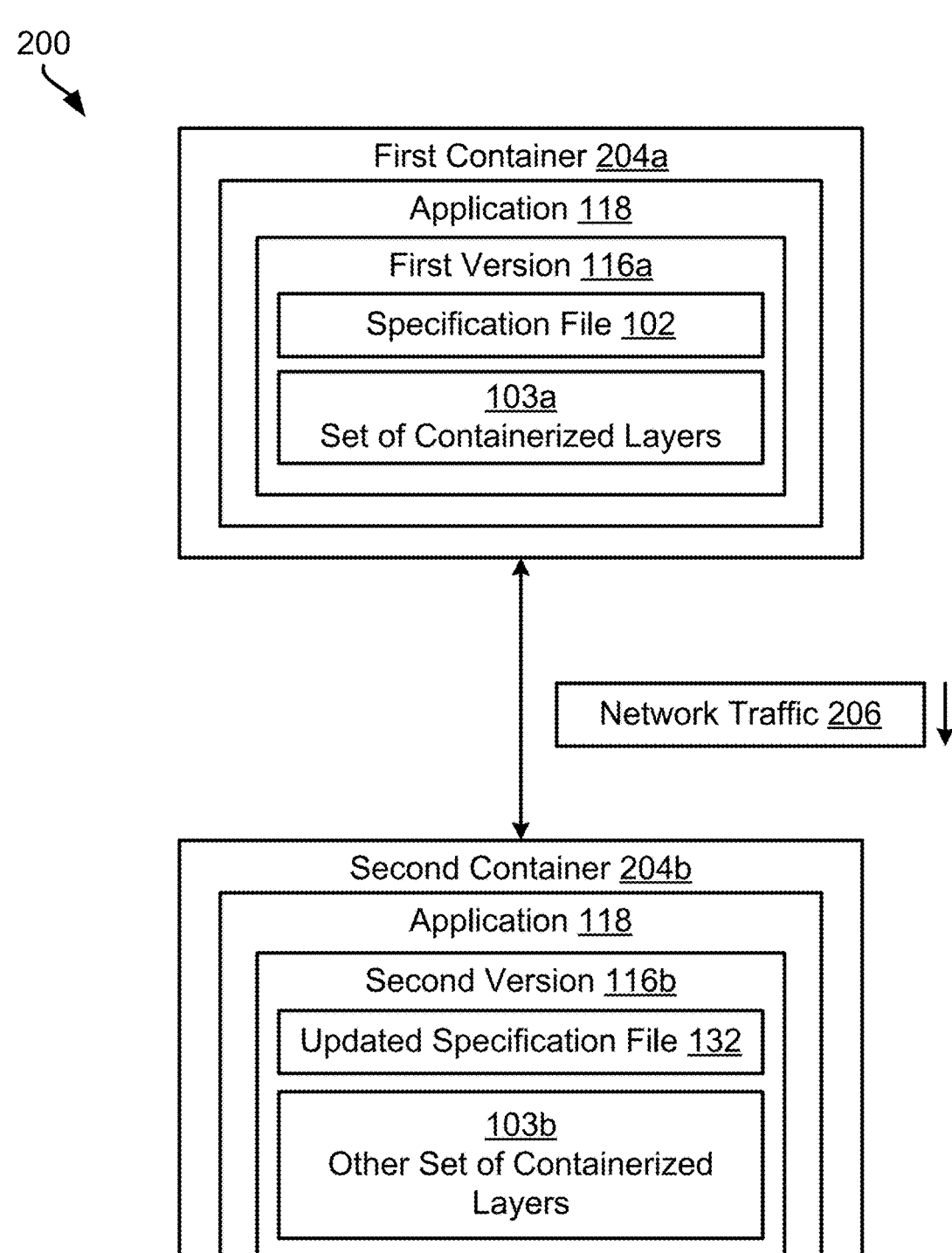
FIG. 2 is a block diagram of an example of a computing environment for migrating to an updated specification file that uses another set of containerized layers derived from another feature flag according to some aspects of the present disclosure.

In some examples, receiving the updated specification file 132 may cause the client device 108 to rebuild a container used to deploy the application 118. In some examples, the client device 108 may tear down the container and rebuild another container using the updated specification file 132. Alternatively, the client device 108 may keep the container running while rebuilding the other container. For example, FIG. 2 is a block diagram of an example of a computing environment 200 for migrating to the updated specification file 132 that uses another set of containerized layers 103*b* derived from another feature flag 136 according to some aspects of the present disclosure. The computing environment 200 can include a first container 204*a* used to deploy the first version 116*a* of the application 118 that is created by the client device 108 after receiving the specification file 102 from the computing device 106. Once the client device 108 receives the updated specification file 132, the client device can keep the first container 204*a* running while using the updated specification file 132 to instantiate a second container 204*b* with a second version 116*b* of the application 118. The client device 108 then can direct network traffic 206 for the first container 204*a* to the second container 204*b*, initiating a relatively seamless failover process. The first container 204*a* can be maintained for a predetermined amount of time such that the application 118 is available even if the second container 204*b* malfunctions. Once the second container 204*b* is established (e.g., not exhibiting signs of malfunctioning or performing below a predefined threshold), the first container 204*a* may be deactivated or removed from the computing environment 200.

Figure 3:
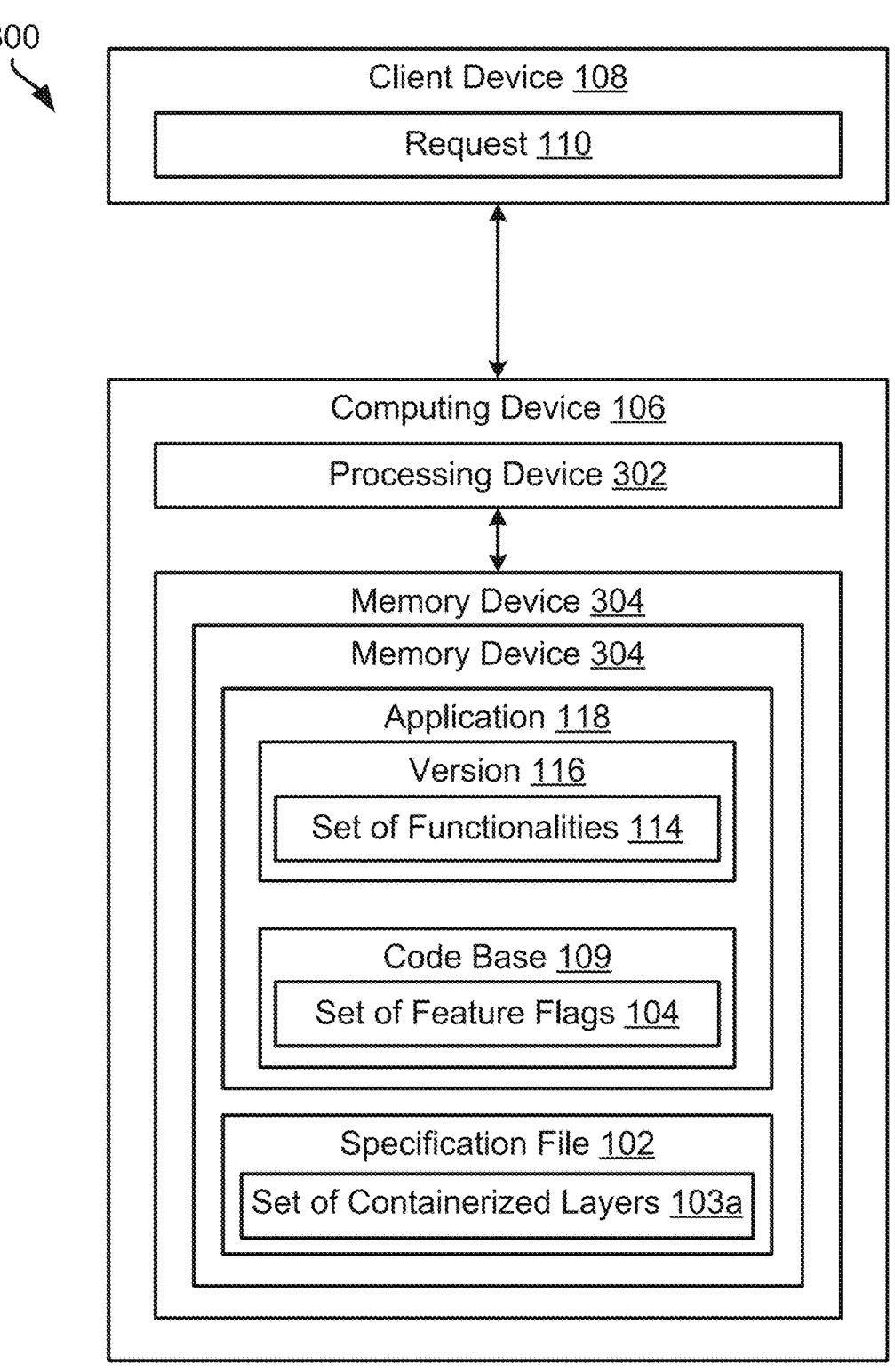
FIG. 3 is a block diagram of an example of a system for building a specification file using a set of containerized layers derived from a set of feature flags according to some aspects of the present disclosure.

FIG. 3 is a block diagram of an example of a system 300 for building a specification file 102 using a set of containerized layers 103*a* derived from a set of feature flags 104 according to some aspects of the present disclosure. The system 300 can include a computing device (e.g., the computing device 106 of FIG. 1) with a processing device 302 communicatively coupled to a memory device 304. In some examples, a client device 108 can be communicatively coupled to the system 300, for example via a network (e.g., the network 112 of FIG. 1).

The processing device 302 can include one processing device or multiple processing devices. Non-limiting examples of the processing device 302 include a Field-Programmable Gate Array (FPGA), an application-specific integrated circuit (ASIC), and a microprocessor. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, Java, Python, or any combination of these.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EE-PROM), flash memory, or any other type of non-volatile memory. At least some of the memory device 304 includes a non-transitory computer-readable medium from which the processing device 302 can read instructions 306. A computer-readable medium can include electronic, optical, magnetic, or other storage devices capable of providing the processing device 302 with the instructions 306 or other program code. Non-limiting examples of a computer-readable medium include magnetic disk(s), memory chip(s), ROM, random-access memory (RAM), an ASIC, a configured processing device, and optical storage.

In some examples, the processing device 302 can execute the instructions 306 to perform operations. For example, the processing device 302 can create a specification file 102 to fulfill a request 110 received from the client device 108 such that the client device 108 can use the specification file 102 to deploy a version 116 of an application 118. The request 110 can include a set of functionalities 114 to be implemented by the version 116 of the application 118. Once the processing device 302 receives the request 110, the processing device 302 can use a set of feature flags 104 corresponding to the set of functionalities 114 from the request 110 to determine the set of containerized layers 103a used to create the specification file 102.

The processing device 302 then can assemble the set of containerized layers 103a into the specification file 102 by stacking the set of containerized layers 103a based on a particular arrangement. The processing device 302 can determine the particular arrangement for the set of containerized layers 103a based on compatibility of each containerized layer with other containerized layers in the set of containerized layers 103a. For example, ensuring compatibility for one or more functionality layers 122a-b of the set of containerized layers 103a may involve stacking a first functionality layer 122a upon a second functionality layer 122b of the set of containerized layers 103a. Stacking the second functionality layer 122b upon the first functionality layer 122a may prevent the first functionality layer 122a from functioning properly due to incorrect infrastructure for the specification file 102. Once the processing device 302 creates the specification file 102 using the set of containerized layers 103a, the processing device 302 can transmit the specification file 102 to the client device 108 to deploy the set of containerized layers 103a as the version 116 of the application 118 in a container 204.

FIG. 4 is a flowchart of an example of a process for building a specification file 102 using a set of containerized layers 103a derived from a set of feature flags 104 according to some aspects of the present disclosure. In some examples, a processing device 302 in a system 300 can perform one or more of the steps shown in FIG. 4. In other examples, the processing device 302 can implement more steps, fewer steps, different steps, or a different order of the steps depicted in FIG. 4. The steps of FIG. 4 are described below with reference to components discussed above in FIGS. 1-3.

In block 402, a processing device 302 receives a request 110 for a version 116 of an application 118 from a client device 108. The request 110 can include a set of functionalities 114 corresponding to a set of feature flags 104 in a code base 109 for the application 118. For example, the set of functionalities 114 in the request 110 may include a security functionality to be implemented in the version 116 of the application 118. A specific feature flag of the set of feature flags 104 can correspond to the security functionality such that enabling the specific feature flag enables the security functionality in the application 118 by switching on corresponding code in the code base 109.

In block 404, in response to receiving the request 110, the processing device 302 determines a set of containerized layers 103a based on the set of feature flags 104. The set of containerized layers 103a can be used to create the version 116 of the application 118. In some examples, the processing device 302 may identify the set of containerized layers 103a stored in a database or a repository using the set of feature flags 104 in the code base 109. The set of containerized layers 103a may be created by the processing device 302, a developer, or a combination thereof. For example, a developer may manually convert the set of feature flags 104 into the set of containerized layers 130a by writing code for the set of containerized layers 103a. Additionally or alternatively, the processing device 302 may create the set of containerized layers 103a based on a predefined rule set that enables the processing device 302 to convert portions of the code base 109 associated with the set of feature flags 104 into the set of containerized layers 103a.

In block 406, the processing device 302 assembles the set of containerized layers 130a to generate a specification file 102 to fulfill the request 110. Assembling the set of containerized layers 130a can involve stacking the set of containerized layers 130a in a particular arrangement that accounts for compatibility of each containerized layer in the set of containerized layers 130a. For example, stacking a first functionality layer 122a on a base layer 120 may preclude a second functionality layer 122b from being stacked on the first functionality layer 122a. In such cases, the particular arrangement may involve stacking the second functionality layer 122b on top of the base layer 120 and stacking the first functionality layer 122a on top of the second functionality layer 122b. In some examples, the processing device 302 may use the set of feature flags 104 to determine the particular arrangement for the set of containerized layers 130a.

In block 408, the processing device 302 transmits the specification file 102 to the client device 108 to deploy the set of containerized layers 130a as the version 116 of the application 118 in a container 204. Thus, the application 118 can be customized according to the request 110 from the client device 108. If the request 110 is a first request 110a, the processing device 302 may receive a second request 110b from the client device 108 with an additional functionality 130 to include in the application 118. Accordingly, the processing device 302 can repeat the steps described above for blocks 404-408 using the second request 110b with the additional functionality 130 to create an updated specification file 132 with another set of containerized layers 103b.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A system comprising:
   a processing device; and
   a memory device including instructions that are executable by the processing device for causing the processing device to perform operations comprising:
   receiving a request for a customized version of an application from a client device, the request indicating a selected set of functionalities to be enabled in the customized version of the application, wherein the selected set of functionalities corresponds to a set of feature flags in a code base for the application;

in response to receiving the request, determining a set of containerized layers based on the selected set of functionalities to be enabled in the customized version of the application, the set of containerized layers having been created based on the set of feature flags, and the set of containerized layers being usable to create the customized version of the application with the selected set of functionalities enabled, wherein at least one containerized layer of the set of containerized layers is configured to provide at least one functionality in the selected set of functionalities to the customized version of the application;

based on determining the set of containerized layers, assembling the set of containerized layers in a particular arrangement to generate a specification file; and fulfilling the request by transmitting the specification file to the client device to deploy the set of containerized layers as the customized version of the application in a container.

2. The system of claim 1, wherein determining the set of containerized layers based on the selected set of functionalities further comprises:

identifying a base layer and one or more functionality layers compatible with the base layer that are combinable to generate the customized version of the application; and identifying the particular arrangement by assembling the base layer with the one or more functionality layers such that the one or more functionality layers are stacked upon the base layer in a compatible order, wherein a functionality layer of the one or more functionality layers depends upon a prerequisite layer in the set of containerized layers to fulfill at least one functionality of the selected set of functionalities associated with the request.

3. The system of claim 1, wherein the request is a first request for a first version of the application, and wherein the operations further comprise:

receiving a second request from the client device for enabling an additional functionality of the application, wherein the additional functionality corresponds to another feature flag in the code base for the application; and in response to receiving the second request, identifying one or more additional layers associated with the other feature flag.

4. The system of claim 3, wherein the operations further comprise:

determining that the one or more additional layers are incompatible with the set of containerized layers;

updating the specification file based on another set of containerized layers corresponding to the selected set of functionalities and the additional functionality, wherein the other set of containerized layers comprises the one or more additional layers in another particular arrangement; and subsequent to updating the specification file, transmitting the updated specification file to the client device to deploy the other set of containerized layers in the other particular arrangement as a second version of the application.

5. The system of claim 3, wherein the operations further comprise, subsequent to identifying the one or more additional layers:

determining that the one or more additional layers are compatible with the set of containerized layers; and transmitting the one or more additional layers to the client device, wherein the client device is configured to attach the one or more additional layers to the set of containerized layers in the specification file to deploy a second version of the application.

6. The system of claim 4, wherein the container is a first container deployable from the specification file, and wherein the operations further comprise, subsequent to transmitting the updated specification file to the client device:

initiating a failover process in which network traffic directed to the first container is routed to a second container deployable from the updated specification file.

7. The system of claim 1, wherein the operations further comprise:

receiving an alert for a vulnerability associated with the specification file;

generating a patch for one or more functionality layers of the set of containerized layers to address the vulnerability; and transmitting the patch to the client device to deploy the patch in the specification file for the application.

8. A method executed by one or more hardware processors, the method comprising:

receiving a request for a customized version of an application from a client device, the request indicating a selected set of functionalities to be enabled in the customized version of the application, wherein the selected set of functionalities corresponds to a set of feature flags in a code base for the application;

in response to receiving the request, determining a set of containerized layers based on the selected set of functionalities to be enabled in the customized version of the application, the set of containerized layers having been created based on the set of feature flags, and the set of containerized layers being usable to create the customized version of the application with the selected set of functionalities enabled, wherein at least one containerized layer of the set of containerized layers is configured to provide at least one functionality in the selected set of functionalities to the customized version of the application;

based on determining the set of containerized layers, assembling the set of containerized layers in a particular arrangement to generate a specification file; and fulfilling the request by transmitting the specification file to the client device to deploy the set of containerized layers as the customized version of the application in a container.

9. The method of claim 8, wherein determining the set of containerized layers based on the selected set of functionalities further comprises:

identifying a base layer and one or more functionality layers compatible with the base layer that are combinable to generate the customized version of the application; and identifying the particular arrangement by assembling the base layer with the one or more functionality layers such that the one or more functionality layers are stacked upon the base layer in a compatible order, wherein a functionality layer of the one or more functionality layers depends upon a prerequisite layer in the set of containerized layers to fulfill at least one functionality of the selected set of functionalities associated with the request.

10. The method of claim 8, wherein the request is a first request for a first version of the application, and wherein the method further comprises:

receiving a second request from the client device for enabling an additional functionality of the application, wherein the additional functionality corresponds to another feature flag in the code base for the application; and in response to receiving the second request, identifying one or more additional layers associated with the other feature flag.

11. The method of claim 10, further comprising:

determining that the one or more additional layers are incompatible with the set of containerized layers;

updating the specification file based on another set of containerized layers corresponding to the selected set of functionalities and the additional functionality, wherein the other set of containerized layers comprises the one or more additional layers in another particular arrangement; and subsequent to updating the specification file, transmitting the updated specification file to the client device to deploy the other set of containerized layers in the other particular arrangement as a second version of the application.

12. The method of claim 10, further comprising, subsequent to identifying the one or more additional layers:

determining that the one or more additional layers are compatible with the set of containerized layers; and transmitting the one or more additional layers to the client device, wherein the client device is configured to attach the one or more additional layers to the set of containerized layers in the specification file to deploy a second version of the application.

13. The method of claim 11, wherein the container is a first container deployable from the specification file, and wherein the method further comprises, subsequent to transmitting the updated specification file to the client device:

initiating a failover process in which network traffic directed to the first container is routed to a second container deployable from the updated specification file.

14. The method of claim 8, further comprising:

receiving an alert for a vulnerability associated with the specification file;

generating a patch for one or more functionality layers of the set of containerized layers to address the vulnerability; and transmitting the patch to the client device to deploy the patch in the specification file for the application.

15. A non-transitory computer-readable medium comprising program code executable by a processing device for causing the processing device to perform operations comprising:

receiving a request for a customized version of an application from a client device, the request indicating a selected set of functionalities to be enabled in the customized version of the application, wherein the selected set of functionalities corresponds to a set of feature flags in a code base for the application;

in response to receiving the request, determining a set of containerized layers based on the selected set of functionalities to be enabled in the customized version of the application, the set of containerized layers having been created based on the set of feature flags, and the set of containerized layers being usable to create the customized version of the application with the selected set of functionalities enabled, wherein at least one containerized layer of the set of containerized layers is configured to provide at least one functionality in the selected set of functionalities to the customized version of the application;

based on determining the set of containerized layers, assembling the set of containerized layers in a particular arrangement to generate a specification file; and fulfill the request by transmitting the specification file to the client device to deploy the set of containerized layers as the customized version of the application in a container.

16. The non-transitory computer-readable medium of claim 15, wherein determining the set of containerized layers based on the selected set of functionalities further comprises:

identifying a base layer and one or more functionality layers compatible with the base layer that are combinable to generate the customized version of the application; and identifying the particular arrangement by assembling the base layer with the one or more functionality layers such that the one or more functionality layers are stacked upon the base layer in a compatible order, wherein a functionality layer of the one or more functionality layers depends upon a prerequisite layer in the set of containerized layers to fulfill at least one functionality of the selected set of functionalities associated with the request.

17. The non-transitory computer-readable medium of claim 15, wherein the request is a first request for a first version of the application, and wherein the operations further comprise:

receiving a second request from the client device for enabling an additional functionality of the application, wherein the additional functionality corresponds to another feature flag in the code base for the application; and in response to receiving the second request, identifying one or more additional layers associated with the other feature flag.

18. The non-transitory computer-readable medium of claim 17, wherein the operations further comprise:

determining that the one or more additional layers are incompatible with the set of containerized layers;

updating the specification file based on another set of containerized layers corresponding to the selected set of functionalities and the additional functionality, wherein the other set of containerized layers comprises the one or more additional layers in another particular arrangement; and subsequent to updating the specification file, transmitting the updated specification file to the client device to deploy the other set of containerized layers in the other particular arrangement as a second version of the application.

19. The non-transitory computer-readable medium of claim 17, wherein the operations further comprise, subsequent to identifying the one or more additional layers:

determining that the one or more additional layers are compatible with the set of containerized layers; and transmitting the one or more additional layers to the client device, wherein the client device is configured to attach the one or more additional layers to the set of containerized layers in the specification file to deploy a second version of the application.

20. The non-transitory computer-readable medium of claim 18, wherein the container is a first container deployable from the specification file, and wherein the operations further comprise, subsequent to transmitting the updated specification file to the client device:

initiating a failover process in which network traffic directed to the first container is routed to a second container deployable from the updated specification file.

\* \* \* \* \*